US00RE38572E1

(19) United States
(12) Reissued Patent
Tetro et al.

(10) Patent Number: US RE38,572 E
(45) Date of Reissued Patent: Aug. 31, 2004

(54) SYSTEM AND METHOD FOR ENHANCED FRAUD DETECTION IN AUTOMATED ELECTRONIC CREDIT CARD PROCESSING

(76) Inventors: Donald Tetro, 6401 Rodeo Dr., Fort Lauderdale, FL (US) 33330; Edward Lipton, 1600 S. Ocean Dr., Fort Lauderdale, FL (US) 33316; Andrew Sackheim, 11500 SW. 22nd Ct., Davie, FL (US) 33024

(21) Appl. No.: 10/210,266

(22) Filed: Jul. 31, 2002

Related U.S. Patent Documents

Reissue of:
(64) Patent No.: 6,095,413
Issued: Aug. 1, 2000
Appl. No.: 08/972,121
Filed: Nov. 17, 1997

(51) Int. Cl.[7] ..... G06K 5/00
(52) U.S. Cl. ..... 235/380; 235/379; 705/44
(58) Field of Search ..... 235/379, 380; 902/5, 25; 705/17, 18, 39, 40, 44; 713/183, 185, 201; 379/91.02

(56) References Cited

U.S. PATENT DOCUMENTS

| | | | |
|---|---|---|---|
| 3,872,438 | A | 3/1975 | Cuttill et al. |
| 4,123,747 | A | 10/1978 | Lancto et al. |
| 4,317,957 | A | 3/1982 | Sendrow |
| 4,439,670 | A | 3/1984 | Basset et al. |
| 4,472,626 | A | 9/1984 | Frid |
| 4,498,000 | A | 2/1985 | Decavele et al. |
| 4,594,663 | A | 6/1986 | Nagata et al. |
| 4,656,342 | A | 4/1987 | Ugon |
| 4,801,787 | A | 1/1989 | Suzuki |

FOREIGN PATENT DOCUMENTS

GB 2 112 190 A * 7/1983

(List continued on next page.)

*Primary Examiner*—Jared J. Fureman

(57) ABSTRACT

A method and system for authorizing an electronic credit card transaction having enhanced measures for detecting fraudulent transactions. A user [at a remote terminal attempting to conduct an electronic credit card transaction] is prompted to input the user's credit card information, address, and social security number. [The information input by the user is retrieved and used for identification purposes.] Initially, the input credit card information is submitted to an issue of the user's credit card to determine whether the input credit card information is valid. The social security number [input by the user] is next checked *against a separate social security number database* to determine if it corresponds to the user. [A database having a stored list of social security numbers is accessed, wherein each of the stored social security numbers includes at least one address stored therewith corresponding to an address of an individual identified by the respective social security number.] The addresses stored in association with the input social security number are retrieved and compared with the input address to determine if the input address corresponds to any of the retrieved stored addresses. If the input credit card information has been confirmed by the issuer as being valid and the address input by the user matches any of the retrieved address stored in association with the input social security number, the electronic credit card transaction is authorized [and allowed to transpire. The social security number database is stored and accessed separately from the issuer's credit card information database to provide an added measure of protection against a person fraudulently gaining access to one of the database, since access to the information in both databases is required to complete the financial transaction.]

43 Claims, 4 Drawing Sheets

U.S. PATENT DOCUMENTS

RE32,985 E 7/1989 Nagata et al.
4,891,503 A * 1/1990 Jewell ..... 235/380
4,947,027 A 8/1990 Golightly
4,947,028 A 8/1990 Gorog
5,012,077 A 4/1991 Takano
5,103,079 A * 4/1992 Barakai et al. ..... 235/380
5,163,086 A 11/1992 Ahearn et al.
5,177,342 A 1/1993 Adams
5,202,826 A 4/1993 McCarthy
5,223,699 A 6/1993 Flynn et al.
5,231,569 A 7/1993 Myatt et al.
5,311,594 A 5/1994 Penzias
5,365,046 A 11/1994 Haymann
5,426,281 A 6/1995 Abecassis
5,457,305 A 10/1995 Akel et al.
5,500,513 A 3/1996 Langhans et al.
5,832,464 A * 11/1998 Houvener et al. ..... 235/379 X
5,914,472 A * 6/1999 Foladare et al. ..... 235/380
6,029,154 A * 2/2000 Pettitt ..... 705/44
6,488,206 B1 * 12/2002 Flaig et al. ..... 235/380
6,496,936 B1 * 12/2002 French et al. ..... 713/201
2002/0029196 A1 * 3/2002 Metcalf et al. ..... 705/40f

* cited by examiner

SYSTEM AND METHOD FOR ENHANCED FRAUD DETECTION IN AUTOMATED ELECTRONIC CREDIT CARD PROCESSING

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to credit card verification processes, and specifically to an improved automated system and process for detecting and preventing the fraudulent use of credit cards by unauthorized users.

2. Description of Related Art

Credit cards have conventionally been used for financial transactions for reasons of public convenience and economy. Typically, a purchaser merely needs to present the credit card to a vendor to complete a transaction, where all information necessary to complete the financial transaction is contained on the credit card. Credit cards inherently possess a certain degree of risk for fraudulent use, since the credit card information necessary for the financial transaction appears on the face of the credit card. Thus, if a credit card is lost or stolen, an unauthorized user of the credit card may complete financial transactions by merely presenting the credit card number to a vendor. In order to prevent unauthorized use of a credit card, vendors have conventionally asked for picture identification or compared the purchaser's signature with a signature on the card to ensure the purchaser is an unauthorized user of the card. However, such authorization techniques can only be performed when the purchaser is in the presence of the vendor. Recently, there has been a trend toward performing credit card transactions electronically over computer networks via the "Internet" or phone lines via audiotext systems. In such electronic credit card transactions, the purchase inputs the credit card information from a remote terminal, such as a computer terminal or telephone keypad, and this information is transmitted to the vendor. Prior authorization techniques for in-person transactions can not be used with electronic credit card transactions, so new security measures are required to prevent fraudulent and unauthorized electronic credit card transactions.

One type of security measure developed for electronic credit card transactions is the verification of the billing address of the credit card holder. The purchaser is required to input his billing address along with his credit card information through the remote terminal. The financial institution issuing the credit card has the billing address for each of its credit card holders stored along with the associated credit card information in a database of credit card holders' accounts. When the credit card information is presented to the financial institution from the vendor for authorization, the stored billing address associated with the credit card number submitted for authorization is compared with the billing address input by the purchaser to ensure they match. If the addresses do not correlate, then the purchaser is deemed to be an unauthorized user and the credit card transaction is denied. However, address verification systems of this type are not entirely effective in preventing unauthorized use. Individuals usually carry their credit cards in their wallets along with other personal identification, such as the individual's driver's license. A thief who steals the individual's wallet will have access to the individual's personal identification as well as their credit card, so that the thief will know the credit card holder's address and will be able to satisfy the address verification test during the authorization procedure. Thus, address verification systems have not been successful in entirely eliminating fraudulent usage of credit cards.

Another security measure developed to prevent fraudulent electronic credit card transactions is the use of automated number identification (ANI) blocking. Since almost all electronic credit card transactions are performed from remote terminals connected through telephone lines, the vendor automatically collects the telephone number associated with the telephone line of the remote device from the telephone carrier. The vendor possesses a stored list of telephone numbers associated with a pattern of fraudulent use, wherein the ANI collected is compared with the stored list to determine if a match exists. If the ANI collected is on the stored list, then that telephone line is blocked from further use. ANI blocking is effective in preventing continued fraudulent usage of a credit card from a particular phone number. However, ANI blocking is also of limited usefulness, because it correlates a telephone number used on one occasion for a fraudulent credit card transaction as a blocked phone number. Even though the telephone number and credit card are not interrelated, the telephone number will be blocked from any further credit card transactions. The next electronic credit card transaction attempted using that telephone number may be a valid transaction, but the transaction will be denied since the telephone number has been blocked by ANI blocking. Thus, remotely terminals frequently having a plurality of different users, such as hotel room telephones or pay phones, will be blocked by ANI blocking by one fraudulent use, preventing subsequent valid credit card transactions from being performed from that remote terminal. While ANI blocking is effective in preventing repeated fraudulent credit card transactions from occurring from the same remote terminal, it also has the detrimental effect of preventing subsequent valid credit card transactions from being performed from the same remote terminal.

Clearly, there is a need for a method for preventing fraudulent electronic credit card transactions which does not also incidentally prevent subsequent valid credit card transactions from being performed. Moreover, there is a need for a more secure method for preventing fraudulent electronic credit card transactions by requiring identifying data that is not easily attainable by a fraudulent user.

OBJECTS AND SUMMARY OF THE INVENTION

It is a primary object of the present invention to overcome the aforementioned shortcomings associated with the prior art.

Another object of the present invention is to provide a more effective system and method for detecting fraud in automated electronic credit card processing.

Yet another object of the present invention is to provide a system and method for enhanced fraud detection in automated electronic credit card processing which reduces the number of fraudulent electronic credit card transaction while minimizing the number of valid credit card transactions incidentally prevented from being performed.

A further object of the present invention is to provide a system and method for enhanced fraud detection in automated electronic credit card processing which minimizes fraudulent use of a credit card by utilizing identifying data that is not readily attainable by a fraudulent user.

These as well as additional objects and advantages of the present invention are achieved by providing a method and system for authorizing an electronic credit card transaction having enhanced measures for detecting fraudulent transaction. A user at a remote terminal, such as a telephone or personal computer, attempting to conduct an electronic credit card transaction is prompted by the automated electronic credit card processing system to input the user's credit card information, address, and social security number. The information input by the user is retrieved and used for identification purposes. Initially, the input credit card information is communicated to an issuer of the user's credit card to determine whether the input credit card information is valid. Once the credit card information is validated by the issuer, the social security number input by the user is checked to determine if it corresponds to the user.

A database having a stored list of social security numbers is accessed, wherein each of the stored social security numbers includes at least one address stored therewith corresponding to an address of an individual identified by the respective social security number. The input social security number is compared with the stored list to confirm that the input social security number is an actual social security number appearing on the stored list. The addresses stored in association with the input social security number are then retrieved, and the input address is compared with the retrieved stored address to determine if the input address corresponds to any of the retrieved stored addresses. If the input credit card information has been confirmed by the issuer as being valid and the address input by the user matches any of the retrieved addresses stored in association with the input social security number, the electronic credit card transaction is authorized and allowed to transpire. The electronic credit card transaction is denied when any of the tests performed are not satisfied, and the user is notified the reason for which the credit card transaction is refused. The social security number database is stored and accessed separately from the issuer's credit card information database to provide an added measure of protection against a person fraudulently gaining access to one of the databases, since access to the information in both databases is required to complete the financial transaction.

As a further fraud detecting measure, the electronic credit card processing system may collect the phone number from which the remote terminal is communicating. The collected phone number is compared with a stored list of blocked phone numbers which are not authorized to perform electronic credit card transactions. The electronic credit card transaction could then be rejected if the collected phone number matches any of the blocked phone numbers on the stored list.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings in which the reference numerals designate like part throughout the figures thereof and wherein:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide enhanced fraud detection in automated electronic credit card processing.

Figure 1:
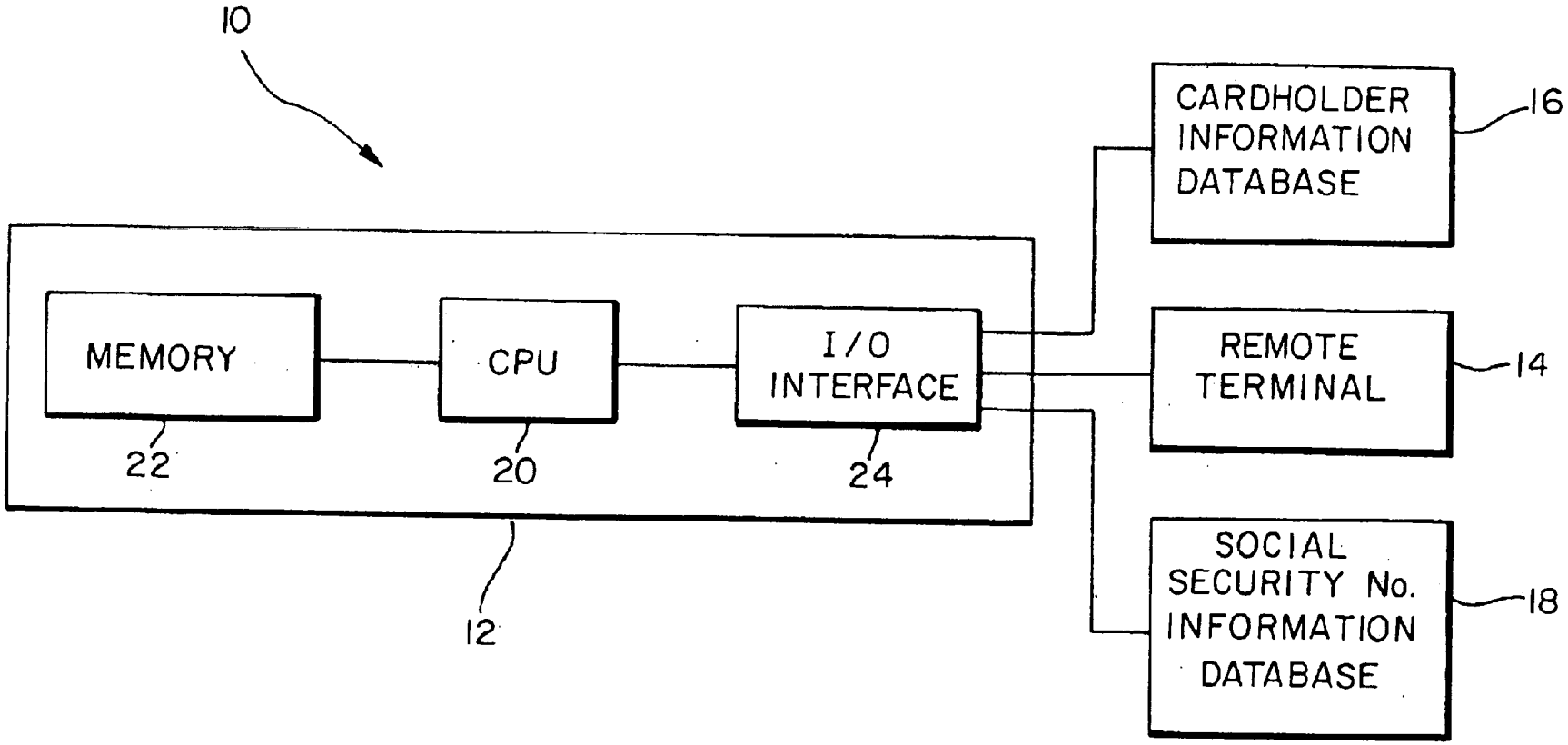
FIG. 1 is a schematic block diagram of a preferred embodiment of the electronic credit card processing system of the present invention.

Referring now to FIG. 1, a schematic block diagram of the components of the electronic credit card processing system 10 of the present invention is illustrated. The system 10 includes a central station 12, a remote terminal 14, a cardholder information database 16 of an issuer of a credit card, and a social security number information database 18. Central station 12 includes a processing unit 20, memory 22, and input/output (I/O) interface 24. Processing unit 20 may include a central processing unit (CPU), microprocessor, or other similar processing device. Central station 12 is connected to remote terminal 14, cardholder information database 16, and social security number information database 18 via communication links, such as telephone lines, RF links, or any other data transmission technique.

Figure 2:
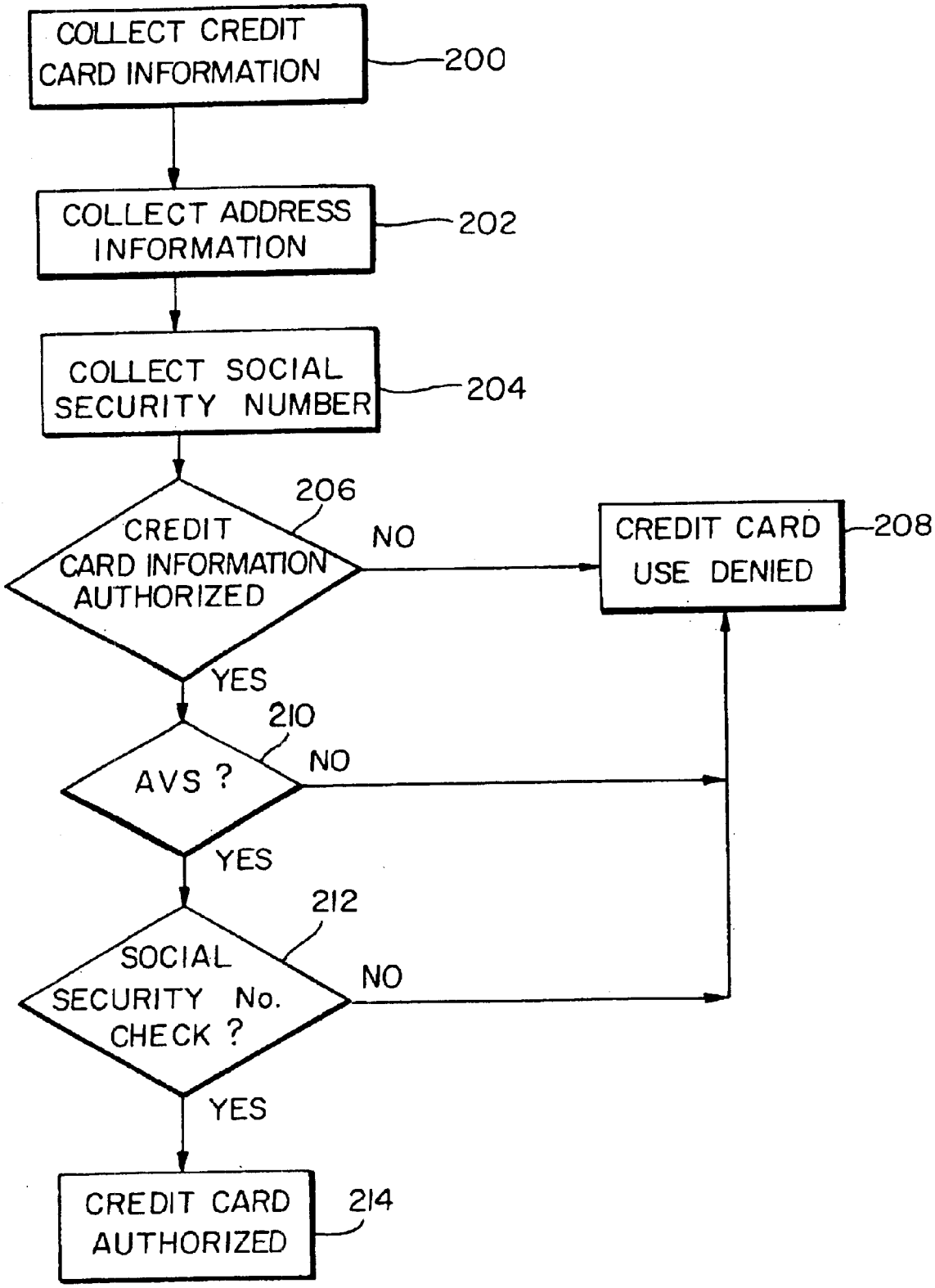
FIG. 2 is an operational block diagram of a preferred method of the present invention for enhanced fraud detection in electronic credit card processing.

The operation of the electronic credit card processing system 10 is illustrated in the flow diagram of FIG. 2. A user at remote terminal 14 attempting to make a purchase by performing an electronic credit card transaction is connected to communicate with central station 12. Remote terminal 14 may include a telephone, personal computer, or any other device through which data may be input and transmitted to central station 12. The user is prompted to input the user's credit card information, billing address, and social security number in steps 200, 202, and 204. From instructions stored in memory 22, processing unit 20 prompts the user to input credit card information identifying the user's credit card account, such as the credit card number and expiration date of the credit card. In step 202, the user is prompted to input the billing address associated with the credit card account. The amount of address information requested may be varied according to the level of security desired during the verification procedure, where higher degrees of security are obtained with when requesting larger amounts of address information. For instance, the user may be prompted to merely enter his zip code for a cursory verification, or may be prompted to enter his full billing address for a more detailed verification. The user is also prompted to input his social security number in step 204. The input credit card information, input billing address, and input social security number are transmitted to and received by central station 12, where such information is stored in memory 22. The information input by the user is later retrieved from memory 22 and used for identification purposes.

In order to confirm that valid credit card information has been provided by the user, the input credit card information is submitted an issuer of the user's credit card in step 206. The issuer possesses a database 16 containing information relating to the credit card accounts for each of its issued credit cards, such as the credit card numbers, expiration dates, billing addresses, and credit limits of its cardholders. A comparison is made between the input credit card information and the stored credit card information in cardholder information database 16 to ensure the input credit card information corresponds to a valid account authorized for the particular transaction being sought. This comparison may be performed either directly by the issuer or by CPU 20 if the cardholder information is communicated back from the issuer to central station 12. If a valid credit card number has not been input by the user, the electronic credit card transaction is denied in step 208. If the input credit card information corresponds to a credit card account in the cardholder information database 16, then the billing address input by the user is compared with a billing address stored in association with the credit card account in cardholder information database 16 in step 210. The credit card transaction is denied in step 208 if the address input by the user fails to correspond to the stored address, whereas the credit card is authorized by the issuer for the transaction when the input and stored addresses correspond.

Once the credit card information is validated by the information provided by the issuer, social security number input by the user is then checked to confirm it corresponds to the credit card holder in step 212. A database 18 having a list of social security numbers stored therein is accessed, wherein each of the stored social security numbers includes at least one address stored therewith corresponding to an address of an individual identified by the respective social security number. Since individuals often have more than one residence or move frequently, multiple addresses may be stored with each social security number identifying that individual. The input social security number is compared with the stored list of social security numbers to confirm that the input social security number is an actual social security number appearing on the list. The addresses stored in association with the input social security number are then retrieved, and the billing address input by the user is compared with the retrieved stored addresses to determine if the input billing address corresponds to any of the retrieved stored addresses. If a match exists between the input billing address and any of the addresses stored in association with the input social security number, the credit card transaction is authorized to proceed in step 214. The electronic credit card transaction is denied in step 208 when the input address fails to match any of the stored addresses.

By utilizing the information stored in social security number information database 18, the number of fraudulent electronic credit card transactions allowed can be greatly reduced. Credit cards are typically carried by individuals in their wallets, where other information identifying the individuals is also typically placed within the individual's wallet. For instance, mot individuals carry their driver's licenses in their wallets. Therefore, if an individual's wallet is lost or stolen, a person coming into possession of the wallet will have access to both the individual's credit card and personal identification. In order to assist in preventing fraudulent usage of a credit card, the present invention require the user of the credit card to know the social security number of the credit card holder. Since most people do not carry their social security number on their person, this identifying data will not be readily available to a person who fraudulently comes into possession of a credit card number.

Furthermore, social security numbers inherently provide reliable identification of individuals as they are unique to each individual as assigned by the U.S. Government. By storing the address at which an individual resides in association with the individual's social security number in database 16, personal information about the individual is stored in association with a unique number which particularly identifies the individual. This provides a high degree of certainty that the cardholder himself is using the credit card when all of the information input by the user matches the stored information in databases 16 and 18. Additionally, an individual's past history of credit card abuse can be stored along with their social security number, so that this past history of credit card abuse will be known to vendors after accessing the social security number database during the authorization procedure. The vendors could then deny the electronic credit card transaction if the individual has a history of credit card fraud, even if the transaction would otherwise be authorized.

Social security number information database 18 and cardholder information database 16 are stored separately from each another and are also accessed separately from each other. If an unauthorized person gains access to credit card information in cardholder information database 16, the unauthorized person will not be able to access the information in social security number information database 18. This prevents the information necessary for authorization of the electronic credit card transaction from being obtained by fraudulently gaining access to one of the information databases. Accessing databases 16 and 18 separately also prevents all of the information necessary for authorization from being obtained if one of the electronic data transmissions is fraudulently intercepted. With the widespread use of on-line computer financial transactions, separate access to databases 16 and 18 is particularly important in preventing fraudulent credit card transactions.

Figure 3:
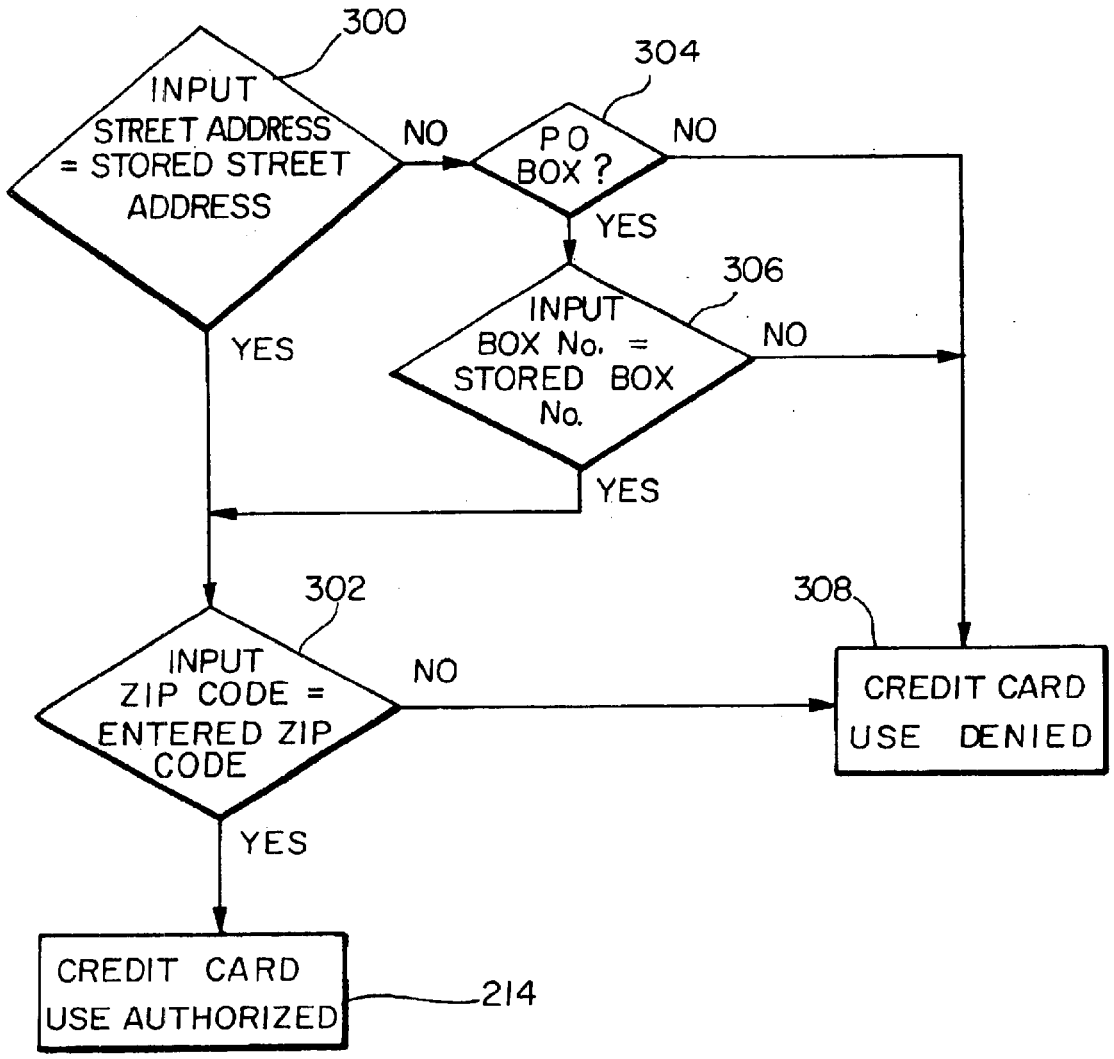
FIG. 3 is an operational block diagram of an alternative method of the present invention for enhanced fraud detection in electronic credit card processing.

Referring now to FIG. 3, the address comparison procedure performed in step 212 will be described in greater detail. A typical address has a field containing the actual street address, the name and/or number of the street, the city, the state, and the zip code. For example, "123 $45^{th}$ Street" contains the street address "123" and the street number "45." The user is prompted to input his actual street address, street name/number, and zip code. In step 300, the street address input by the user is compared with the street address contained in the stored address retrieved from social security database 18. If the street addresses match, the electronic credit card processing system 10 moves on to step 302 where the zip code input by the user is compared with the zip code contained in the retrieved stored addresses. If the street addresses are different from one another, the input billing address is analyzed to ascertain whether the word "BOX" appears in the input billing address in step 304 in order to determine if the input address is a Post Office Box or APO address. If the word "BOX" is found, the term following "BOX" is assumed to be the box number and the input box number is compared with the box number contained in the retrieved stored addresses in step 306. If either the word "BOX" is not found to be present in the input billing address in step 304 or a match is not found between box numbers in step 306, then it is determined that the input social security number is not related to the credit card and the electronic transaction is denied in step 308.

If a match exists between the input box number and stored box number, the system moves on to step 302 to compare the input zip code with the stored zip code. A typical city, state, and zip code address appears as "Anytown, State 12345." Thus, processing unit 20 determines whether the last term in the city, state, zip code address stored in social security number information database matches the input zip code. If a match exists between the stored zip code and the input zip code, the address verification procedure for the electronic credit card transaction is satisfied and the credit card is authorized for use in step 214. If none of the stored zip codes match the zip code input by the user, the input social security number is deemed to be unrelated to the credit card and the electronic transaction is denied in step 308. In alternative embodiments of the present invention, other variations in the address information collected and compared may be performed without departing from the spirit and scope of the present invention.

It is also possible for a vendor using electronic credit card processing system 10 of the present invention to limit the amount of expenditures a user may make in a given time period in order to further safeguard against fraudulent transactions. Prior to authorizing the electronic credit card transaction, a threshold check may be performed to ensure that the user has not exceeded a predetermined expenditure limit within a given time period. For example, the user may be limited to certain amount of expenditures each day, each week, each month, etc. The time period are of the rolling variety where the last given number of days prior to the attempted transaction are monitored for the threshold check. The criteria to be used in each threshold check is determined by the type of goods or services to which the credit card transaction relates. By utilizing an expenditure threshold, the electronic credit card processing system 10 limits the number of fraudulent transactions which may be performed by a user who has obtained all of the necessary information to satisfy the tests for authorization. Placing a limit on the expenditures allowed for an electronic credit card transaction is also useful in preventing "friendly fraud," which occurs when an individual is a valid user of the credit card but has exceeded a limit for the transaction attempted. For instance, where multiple credit cards exist for a certain credit card number, thresholds can be established based on the social security number so that a "global" threshold can be established and upheld for all uses of the credit card. Further, after an electronic credit card transaction has transpired, subsequent use of the same credit card number may be blocked within a predetermined time period by using the social security number as the variable monitored.

Figure 4:
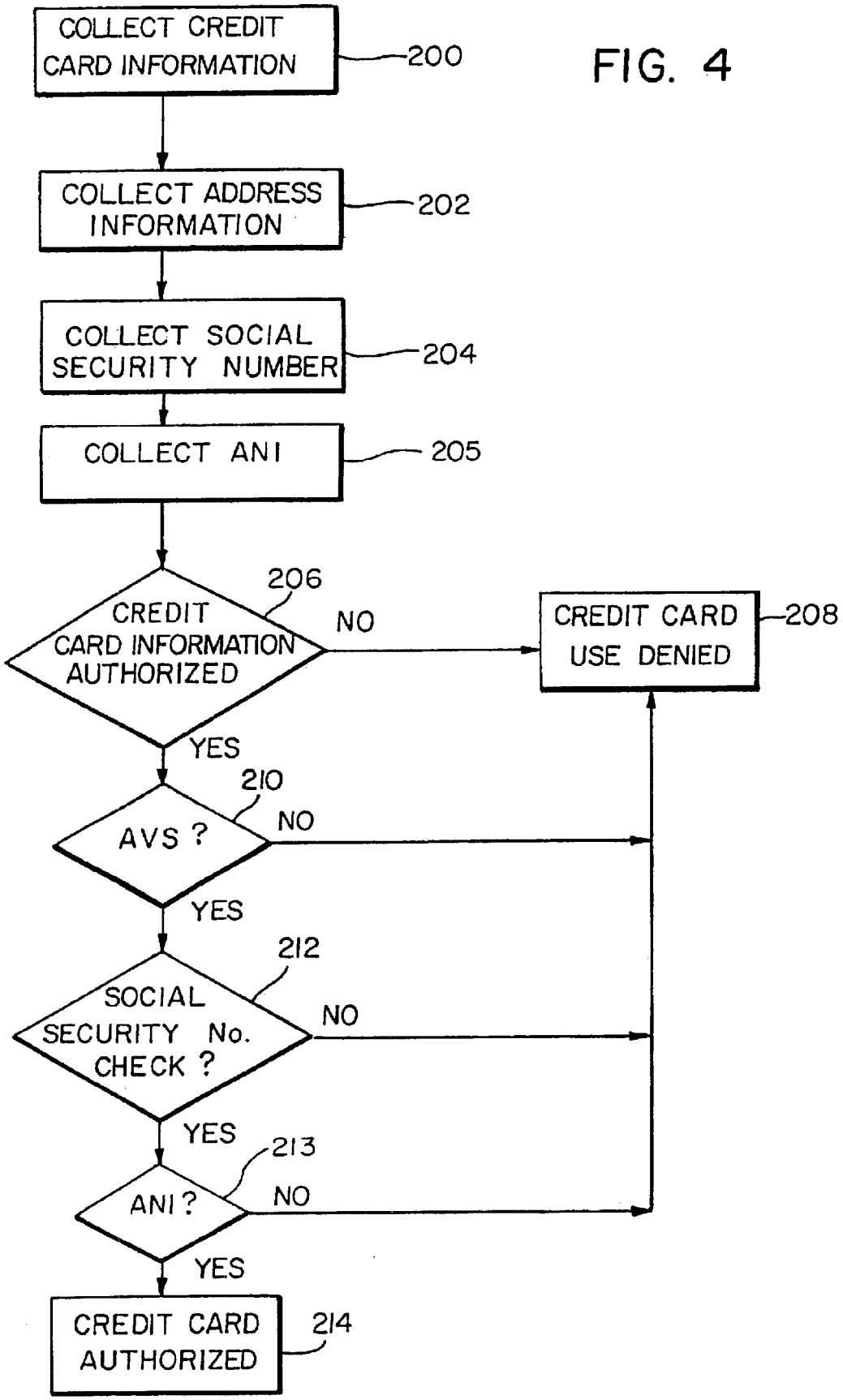
FIG. 4 is an operational block diagram of the address verification process in the methods of the present invention for enhanced fraud detection in electronic credit card processing.

As a further fraud detecting measure, the electronic credit card processing system 10 may employ automatic number identification (ANI) blocking in addition to the main authorization procedure, as shown in FIG. 4.

The authorization procedure is substantially the same as the procedure discussed in association with FIG. 2, except step 205 is added where the phone number from which the remote terminal is communicating is automatically collected by central station 12 from the phone provider and stored in memory 22. Further, in step 213, the collected phone number is compared with a list of blocked phone numbers stored in memory 22 which are not authorized to perform electronic credit card transactions. The electronic credit card transaction is rejected in step 208 if the collected phone number matches any of the blocked phone numbers on the stored list. All other steps in the authorization procedure are performed as previously described, and their discussion will be omitted from the description of this authorization procedure, ANI blocking can be useful in preventing continued fraudulent use from a particular phone number known to have a large amount of fraudulent use associated therewith, and ANI blocking may be selectively employed to accomplish this result.

The above-described process of collecting data from a user and processing the data to authorize an electronic credit card transaction is automated, and no human intervention is required during the authorization procedure. However, it is understood that the system and method of the present invention may also be employed by vendors who perform in-person credit card transactions with purchasers, where the remote terminal used for inputting the purchaser's information would located at the vendor's store.

As can be seen from the foregoing, the system and method for enhanced fraud detection in automated electronic credit card processing performed in accordance with the present invention will reduce the number of fraudulent electronic credit card transactions while minimizing the number of valid credit card transactions incidentally prevented from being performed. Moreover, the system and method for enhanced fraud detection in automated electronic credit card processing performed in accordance with the present invention will minimize fraudulent use of a credit card by utilizing identifying social security number data that is not readably attainable or accessible by a fraudulent user.

In each of the above embodiments, the different methods of preventing fraudulent credit card transactions by the electronic credit card processing system of the present invention are described separately in each of the embodiments. However, it is the full intention of the inventors of the present invention that the separate aspects of each embodiment described herein may be combined with the other embodiments described herein. Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A method of authorizing an electronic credit card transaction, comprising the steps of:

generating a request for a user at a remote terminal to input the user's credit card information, address, and social security number;

receiving the information input by the user;

communicating the input information to a credit card database provided by an issuer of the user's credit card to determine whether the input information is valid;

accessing a social security number database having a list of social security numbers stored therein, wherein each of said stored social security numbers include at least one address stored therewith corresponding to an address of an individual identified by the respective social security number;

retrieving the at least one stored address associated with the input social security number;

comparing the input address with the at least one retrieved stored address to corroborate the information stored in the credit card database with the information stored in the social security number database; and authorizing the electronic credit card transaction when said input information is determined to correspond to information stored in both the credit card database and the social security number database.

2. The method of authorizing an electronic credit card transaction as defined in claim 1, wherein the social security number database is stored separately from the credit card information stored by the issuer.

3. The method of authorizing an electronic credit card transaction as defined in claim 1, wherein the address input by the user is communicated to the issuer along with the input credit card information for validation by the issuer.

4. The method of authorizing an electronic credit card transaction as defined in claim 1, further comprising the steps of:

collecting a phone number from which the remote terminal is communicating;

comparing the collected phone number with a stored list of blocked phone numbers which are not authorized to perform electronic credit card transactions; and rejecting authorization if the collected phone number matches any of the blocked phone numbers on the stored list.

5. The method of authorizing an electronic credit card transaction as defined in claim 1, further comprising the steps of:

delivering a negative response to the user indicating that the electronic credit card transaction is being refused when authorization is not granted; and notifying the user of the reason for which the credit card transaction is refused.

6. The method of authorizing an electronic credit card transaction as defined in claim 1, further comprising the steps of:

determining whether a predetermined expenditure limit has been exceeded within a given time period by the credit card identified by the input credit card information; and denying authorization if the predetermined expenditure limit has been exceeded.

7. The method of authorizing an electronic credit card transaction as defined in claim 1, wherein the address input by the user includes [the] *a* street address and zip code of the user.

8. The method of authorizing an electronic credit card transaction as defined in claim 7, wherein said address comparing step compares the input street address and zip code with the retrieved stored addresses in the social security database to determine if the input street address and zip code match any of the street address and zip codes in the retrieved stored addresses.

9. The method of authorizing an electronic credit card transaction as defined in claim 8, further comprising the step of determining whether the input street address is a P.O. Box if the input street address does not initially match a retrieved stored address.

10. The method of authorizing electronic credit card transactions as defined in claim 1, wherein the entire authorizing procedure is automated without the need for human intervention.

11. The method of authorizing an electronic credit card transaction as defined in claim 1, wherein the social security number database is independent from the user's credit card information.

12. An automated system for authorizing an electronic credit card transaction, comprising:

inquiry means for requesting a user at a remote terminal to input the user's credit card information, address, and social security number;

receiving means for collecting the information input by the user;

comparing means for comparing the input information with information stored in a credit card information database provided by an issuer of the user's credit card to determine whether the input information is valid;

retrieval means for accessing a social security number database of stored social security numbers having at least one address stored therewith corresponding to an address of an individual identified by the respective social security number and retrieving the at least one stored address associated with the social security number input by the user;

processing means for comparing the input address with the at least one retrieved stored address from the social security number database and corroborating the information stored in the credit card information database; and authorizing means for authorizing the electronic credit card transaction when said input information is determined to correspond to the retrieved information stored in both the credit card information database and the social security number database.

13. The automated system for authorizing an electronic credit card transaction as defined in claim 12, wherein the social security number database is stored separately from the credit card information stored by the issuer.

14. The automated system for authorizing an electronic credit card transaction as defined in claim 12, wherein the address of the user is communicated to the issuer along with the credit card information for validation by the issuer.

15. The automated system for authorizing an electronic credit card transaction as defined in claim 12, further comprising:

number identification means for collecting a phone number from which the remote terminal is communicating; and comparison means for comparing the collecting phone number with a stored list of blocked phone numbers which are not authorized to perform electronic credit card transactions and rejecting authorization if the collected phone number matches any of the blocked phone numbers on the stored list.

16. The automated system for authorizing an electronic credit card transaction as defined in claim 12, further comprising notification mean for generating a negative response to the user indicating that the electronic credit card transaction is being refused when authorization is not granted and notifying the user of the reason for which the credit card transaction is refused.

17. The automated system for authorizing an electronic credit card transaction as defined in claim 12, further comprising delimiting means for determining whether a predetermined expenditure limit has been exceeded within a given time period by the credit card identified by the input credit card information and denying authorization if the predetermined expenditure limit has been exceeded.

18. The automated system for authorizing an electronic credit card transaction as defined in claim 12, wherein the address input by the user includes [the] *a* street address and zip code of the user.

19. The automated system for authorizing an electronic credit card transaction as defined in claim [16] *18*, wherein said processing means further compares the input street address and zip code with the retrieved stored addresses in the social security database to determine if the input street address and zip code match any of the street addresses and zip codes in the retrieved stored addresses.

20. The automated system for authorizing an electronic credit card transaction as defined in claim 19, wherein said processing means determines whether the input street address is a P.O. Box if the input street address does not initially match a retrieved stored address.

21. The automated system for authorizing an electronic credit card transaction as defined in claim 12, wherein the entire system is automated without the need for human intervention.

22. The automated system for authorizing an electronic credit card transaction as defined in claim 12, wherein the social security number database is independent from the user's credit card information.

*23. A method of authorizing a credit card for transactions, comprising the steps of:*

*receiving information input by a user, wherein said input information includes credit card information for a credit card being authorized, identifying information about the user, and information relating to a social security number of the user;*

*validating the input information with information stored in a credit card database provided by an issuer of the user's credit card;*

*accessing a social security number databases containing information about persons including a correspondence between stored social security number information and stored identifying information about persons, wherein each item of stored social security number information includes corresponding stored identifying information;*

*retrieving the corresponding stored identifying information associated with the input social security number information;*

*comparing the input identifying information with the stored identifying information corresponding to the input social security number information to corroborate the validity of the information stored in the credit card database with the information stored in the social security number database; and*

*authorizing the credit card for transactions when said input information is determined to correspond to information stored in both the credit card database and the social security database.*

*24. The method of authorizing a credit card for transactions as defined in claim 23, wherein the identifying information is an address.*

*25. The method of authorizing a credit card for transactions as defined in claim 24, wherein the address input by the user is communicated to the issuer along with the input credit card information for validation by the issuer.*

*26. The method of authorizing a credit card for transactions as defined in claim 23, wherein the social security number database is stored separately from the credit card information stored by the issuer.*

*27. The method of authorizing a credit card for transactions as defined in claim 23, wherein the social security number database is independent from the user's credit card information.*

*28. The method of authorizing a credit card for transactions as defined in claim 23, wherein said input social security number information includes at least a portion of the user's social security number.*

*29. An automated system for authorizing a credit card for transactions, comprising:*

*receiving means for receiving information input by a user wherein said input information includes credit card information for a credit card being authorized, identifying information about the user, and information relating to a social security number of the user;*

*comparing means for comparing the input information with information stored in a credit card information database provided by an issuer of the user's credit card to determine whether the input information is valid;*

*retrieval means for accessing a social security number database containing information about persons including a correspondence between stored social security number information and stored identifying information about persons and retrieving the stored identifying information corresponding to the social security number information input by the user;*

*processing means for comparing the input identifying information with the stored identifying information from the social security number database to corroborate the validity of the information stored in the credit card information database; and*

*authorizing means for authorizing the credit card for transactions when said input information is determined to correspond to the retrieved information stored in both the credit card information database and the social security number database.*

*30. The automated system for authorizing a credit card for electronic transactions as defined in claim 29, wherein the identifying information includes an address.*

*31. The automated system for authorizing a credit card for electronic transactions as defined in claim 30, wherein the address of the user is communicated to the issuer along with the credit card information for validation by the issuer.*

*32. The automated system for authorizing a credit card for electronic transactions as defined in claim 29, wherein said input social security number information includes at least a portion of the user's social security number.*

*33. The automated system for authorizing a credit card for transactions as defined in claim 29, wherein the social security number database is stored separately from the credit card information stored by the issuer.*

*34. The automated system for authorizing a credit card for electronic transactions as defined in claim 29, wherein the social security number database is independent from the user's credit card information.*

*35. A computer-readable medium storing a program for authorizing a credit card for transactions, said program comprising the steps of:*

*receiving information input by a user, wherein said input information includes credit card information for a credit card being authorized, identifying information about the user, and information relating to a social security number of the user;*

*validating the input information with information stored in a credit card database provided by an issuer of the user's credit card;*

*accessing a social security number database containing information about persons including a correspondence between stored social security number information and stored identifying information, wherein each item of stored social security number information includes corresponding stored identifying information;*

*retrieving the corresponding stored identifying information associated with the input social security number information;*

*comparing the input identifying information with the stored identifying information corresponding to the input social security number information to corroborate the validity of the information stored in the credit card database with the information stored in the social security number database; and*

*authorizing the credit card for transactions when said input information is determined to correspond to information stored in both the credit card database and the social security number database.*

*36. The computer-readable medium of claim 35, wherein the identifying information is an address.*

*37. The computer-readable medium of claim 36, wherein said program further comprises communicating the address*

*input by the user to the issuer along with the input credit card information for validation by the issuer.*

*38. The computer-readable medium of claim 35, wherein said input social security number information utilized by said program includes at least a portion of the user's social security number.*

*39. A method of authorizing a credit card for transactions comprising the steps of:*

*receiving information input by a user, wherein said input information includes credit card information for a credit card being authorized, information associated with the user, and information uniquely identifying the user;*

*validating the input information with information stored in a credit card database provided by an issuer of the user's credit card;*

*accessing an independent database containing information about individuals including a correspondence between stored information uniquely identifying individuals and stored information associated with individuals wherein a correspondence exists in said independent database for each individual between respective stored uniquely identifying information and respective stored information associated with each individual;*

*retrieving the stored information associated with an individual which corresponds to the uniquely identifying information input by the user;*

*comparing the input information associated with the user with the stored information associated with an individual corresponding to the input uniquely identifying information to corroborate the validity of the information stored in the credit card database with the information stored in the independent database; and*

*authorizing the credit card for transactions when said input information is determined to correspond to information stored in both the credit card database and the independent database.*

*40. The method of authorizing a credit card for transactions as defined in claim 39, wherein the information associated with the user is an address.*

*41. The method of authorizing a credit card for transactions as defined in claim 40, wherein the address input by the user is communicated to the issuer along with the input credit card information for validation by the issuer.*

*42. The method of authorizing a credit card for transactions as defined in claim 39, wherein the independent database is stored separately from the credit card information stored by the credit card issuer.*

*43. The method of authorizing a credit card for transactions as defined in claim 39, wherein said uniquely identifying information includes at least a portion of the user's social security number.*

* * * * *